(12) United States Patent
Ogure

(10) Patent No.: US 6,455,475 B1
(45) Date of Patent: Sep. 24, 2002

(54) SLIDING MEMBER AND PROCESS FOR PRODUCING THE SAME

(75) Inventor: Naoaki Ogure, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/709,732

(22) Filed: Nov. 13, 2000

(30) Foreign Application Priority Data

Nov. 12, 1999 (JP) .......................................... 11-322710

(51) Int. Cl.[7] .............................................. F16C 33/06
(52) U.S. Cl. ....................... 508/103; 508/100; 428/673
(58) Field of Search ................................. 508/100, 103; 428/673

(56) References Cited

U.S. PATENT DOCUMENTS

| | | | |
|---|---|---|---|
| 5,108,813 A | * | 4/1992 | Noda et al. ................ 428/141 |
| 5,185,216 A | * | 2/1993 | Tanaka et al. .............. 428/614 |
| 5,466,538 A | * | 11/1995 | Tanaka et al. .............. 428/610 |
| 5,938,864 A | * | 8/1999 | Tomikawa et al. .......... 428/545 |
| 5,972,070 A | * | 10/1999 | Kondoh et al. .............. 75/255 |

FOREIGN PATENT DOCUMENTS

JP      60135564 A    *   7/1985

* cited by examiner

*Primary Examiner*—Jacqueline V. Howard
(74) *Attorney, Agent, or Firm*—Browdy and Neimark

(57) ABSTRACT

The present invention is to provide a sliding member and a process for producing the same, which produce a high-quality soft metal layer uniformly coated on a sliding surface by a process alternative to electroplating or ion plating. The metal layer has been formed by ultra-fine metal (silver) particles dissolved in a solvent, which is coated on a sliding surface of the sliding member and dried and fired such that ultra-fine metal particles are melt and bonded to one another. The average particle diameter of the ultra-fine metal (silver) particles is 1 to 20 nm, and in particular 1 to 10 nm. The whole metal coating process can be carried out in the air at room temperature to about 200–300° C.

6 Claims, 3 Drawing Sheets just after coating after drying and firing
(200°C × 0.5h)

SLIDING MEMBER AND PROCESS FOR PRODUCING THE SAME

BACKGROUND OF THE INVENTION

1. Field of the Invention

The present invention relates to a sliding member usable under sliding conditions, for example, in vacuum, high temperature, or ultraclean environment, where none of liquids, viscous materials, and solid lubricants can be used, and a process for producing the same.

2. Description of the Related Art

For example, when sliding members and rolling members, such as sliding bearings, seal mechanisms, bolts, nuts, pistons, crankshaft fulcrums, pins, cams, links, jack shafts, gears, shaft seal parts, and rolling element bearings, are used at high temperatures or under vacuum, two planes in pair cause relative movement while they are in contact with each other. This creates friction or microscopic collision between the surface of one of the members and the surface of the other member. When the pressure of contact between two planes (plane pressure) is high and the relative movement speed is high, local heat generation or scratch of the counter material by projections, damage by abrasion and the like occur. In extreme cases, seizing or adhesion occurs, often leading to suspension of operation.

In order to prevent these unfavorable phenomena, when sliding members are used under severe sliding conditions, a suitable level of lubricity should be required to act on a portion between two planes facing each other.

Here, in the case of sliding members to be used under ordinary environment, a liquid or a viscous lubricating oil (lubricant) may be provided between two planes in pair to acquire satisfactory lubricity. Thus, the two planes in pair are placed in a fluid film lubrication state or a boundary lubrication state. This can avoid adhesion between the two planes.

On the other hand, when a lubricating oil is used as lubrication between the sliding members, which should be unavoidably used under vacuum, high temperature, or ultraclean environment, the presence of the lubricating oil itself becomes an obstacle to maintain a desired environment, or otherwise the lubricating oil easily undergoes a change of properties which results in the disappearance of the desired lubricity. For this reason, lubricating oils cannot be used under vacuum, high temperature, or ultraclean environment. This makes it necessary to ensure the lubricity by materials other than liquid or viscous lubricating materials.

Various solid lubricants have hitherto been used as alternative to liquid or viscous lubricants. Representative examples thereof include ① graphite, ② compounds such as molybdenum disulfide, phthalocyanine, lead oxide, and boron nitride, and ③ plastics. A suitable material is selected among these materials by taking into consideration the environment (for example, temperature, degree of vacuum, corrosiveness, chemical activity, pressure of the plane of contact, and sliding speed) and used. Since, these alternative materials have both advantageous and disadvantageous properties respectively, the use of them under severe conditions in such required environments is limited naturally.

For example, graphite can be used in the air without causing any problem at a temperature of about 400° C., which is a higher temperature than where conventional lubricating oils can be used. Further, graphite is suitable for use where electrical conductivity is required. However, graphite is almost useless under vacuum environments. On the other hand, molybdenum disulfide can be used at a temperature of 1100° or above under vacuum environment, and can be used in the air at a temperature of 300° C. or below without undergoing oxidation. Molybdenum disulfide, however, has a low durability against repeated use for a long period of time. Phthalocyanine can withstand a temperature up to 600° C., and lead oxide can withstand a temperature up to 500° C. That is, these substances have features of high resistance to high temperatures. Plastics have a low coefficient of friction even in bulk. In particular, fluororesins have a very low coefficient of friction of 0.04, but on the other hand, due to the nature of the resins, the maximum temperature which they can withstand is 250° C. (starting temperature of decomposition), which is very inferior compared to inorganic materials and metals.

Thus, there are a wide variety of coating-type lubricants for use in sliding members, ranging from liquids to solids, each of which have both advantages and disadvantages.

Accordingly, for sliding members used under severe conditions, instead of using lubricants, various attempts have been made to ensure the lubricity by thinly coating a soft metal on the sliding surface of hard metal.

FIG. 4 shows a general construction of this type of conventional sliding member, wherein one sliding surface 10a in a pair of sliding members 10, 12, is thinly coated with a soft metal layer 14 formed of a soft material such as lead, indium, gold, or silver. The sliding members 10, 12 are formed of a hard metal moved each other while they are in contact with the soft metal layer 14. This concept is based on such an idea that lubricating action is caused by the soft metal, in which low shearing stress of the soft metal is utilized.

That is, in this case, a true contact area A between the sliding members 10, 12 is determined by the hardness of a harder metal member (sliding member 12). When the contact surfaces once come into true contact with each other and followed by relative movement (friction) to cause shear separation of the two surfaces from each other, a breakage occurs in the thin soft metal layer 14. In particular, when any lubricating oil is absent between the two surfaces, a piece of soft metal 16 separated by the breakage is fast moved around suitably between the two contacting surfaces. Even though a part of the soft metal layer 14 has been breached, it has been found that a piece of soft metal 16 is transferred from other part onto this breached portion, thereby the breached portion is self-repaired. In this case, when lubricating oil is used therewith, it becomes difficult to transfer the fluid soft metal 16 to the breached portion. Therefore, self-repairing is hardly expected, and on the contrary, this sometimes causes inconvenience.

Here, silver as a soft metal is said to be the best material for use in high load slide bearings, because silver is highly compatible with the hard metal member, and at the same time, has good thermal conductivity and toughness.

Electroplating is generally used for coating a soft metal on a sliding member formed of a hard metal. For example, when a sliding member is plated with silver on a commercial scale, a commonly used method is such that plating is carried out using a plating solution composed mainly of silver potassium cyanide at a current density of not less than 20 A/dm$^2$ by taking advantage of high stability of the cyan complex.

The electroplating of the sliding member on its sliding surface, however, suffers from the following drawbacks: (1) a special power supply unit should be generally provided; and (2) when the objects have complicated shapes or members which are very small, the current distribution is likely to be uneven, resulting in a variation in plating thickness or plating quality from portion to portion.

Accordingly, the electroplating can be satisfactorily brought its advantage only for mass-produced objects having a simple shape. By contrast, the electroplating cannot be satisfactorily used for members having a complicate shape and deformed members having a labyrinth contour. Also, the electroplating cannot be satisfactorily used for objects, which are required to execute the plating on customer's site (in particular, for example, in the case of assembling, installation, and repair), but not within the production plant. Thus, the development of a method, other than electroplating, which can surely and easily form a soft metal layer on a sliding member in its sliding surface, has been strongly desired. Further, harmful effects of highly poisonous cyanogenic compounds contained in conventional plating solutions on the health of workers have also been strongly pointed out.

Incidentally, it has also been proposed to coat on rolling bearing parts or the like with silver by ion plating. Ion plating, however, requires the use of a much larger apparatus than electroplating apparatuses, and on-site works are likely to be impossible.

SUMMARY OF THE INVENTION

The present invention has been made in view of the above drawbacks. It is therefore an object of the present invention to provide a sliding member and a process for producing the same, wherein a high-quality soft metal layer is evenly coated on a sliding surface by a process alternative to electroplating or ion plating.

In order to attain the above object, according to an aspect of the present invention, there is provided a sliding member comprising: a sliding member having a sliding surface thereon; and a metal layer covering said sliding surface.

The metal layer has been formed by ultra-fine metal particles, which have been melted and bonded to one another. The ultra-fine metal particles are preferably ultra-fine silver particles and the average particle diameter of the ultra-fine silver particles is 1 to 20 nm, and in particular 1 to 10 nm.

According to another aspect of the present invention, there is provided a process for producing a sliding member having a metal layer on its sliding surface, which comprises: providing an ultra-fine particle solution of ultra-fine metal particles dispersed in a predetermined solvent; bringing the ultra-fine particle solution into contact with said sliding surface of said sliding member; drying the ultra-fine particle solution deposited on said sliding surface to form dried coating; and heat treating said dried coating to melt and bond the ultra-fine metal particles to one another.

By virtue of this constitution, the sliding surface can be evenly covered with a thin metal (for example, silver) layer of orderly arranged pure ultra-fine metal particles produced by decomposing, through firing. The whole organic matter has been contained in a solvent with ultra-fine metal particles being homogeneously mixed and dispersed therein. The whole metal coating process can be carried out in the air at room temperature to about 200–300° C. Thus, a sliding surface of the sliding member can be covered with a metal layer at much lower cost in a simpler manner with higher reliability.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 3 is a schematic diagram illustrating coating of a metal layer on a sliding member, wherein

DETAILED DESCRIPTION OF THE PREFERRED EMBODIMENTS

Embodiments of the present invention will be described hereinafter with reference to the accompanying drawings.

Figure 1:
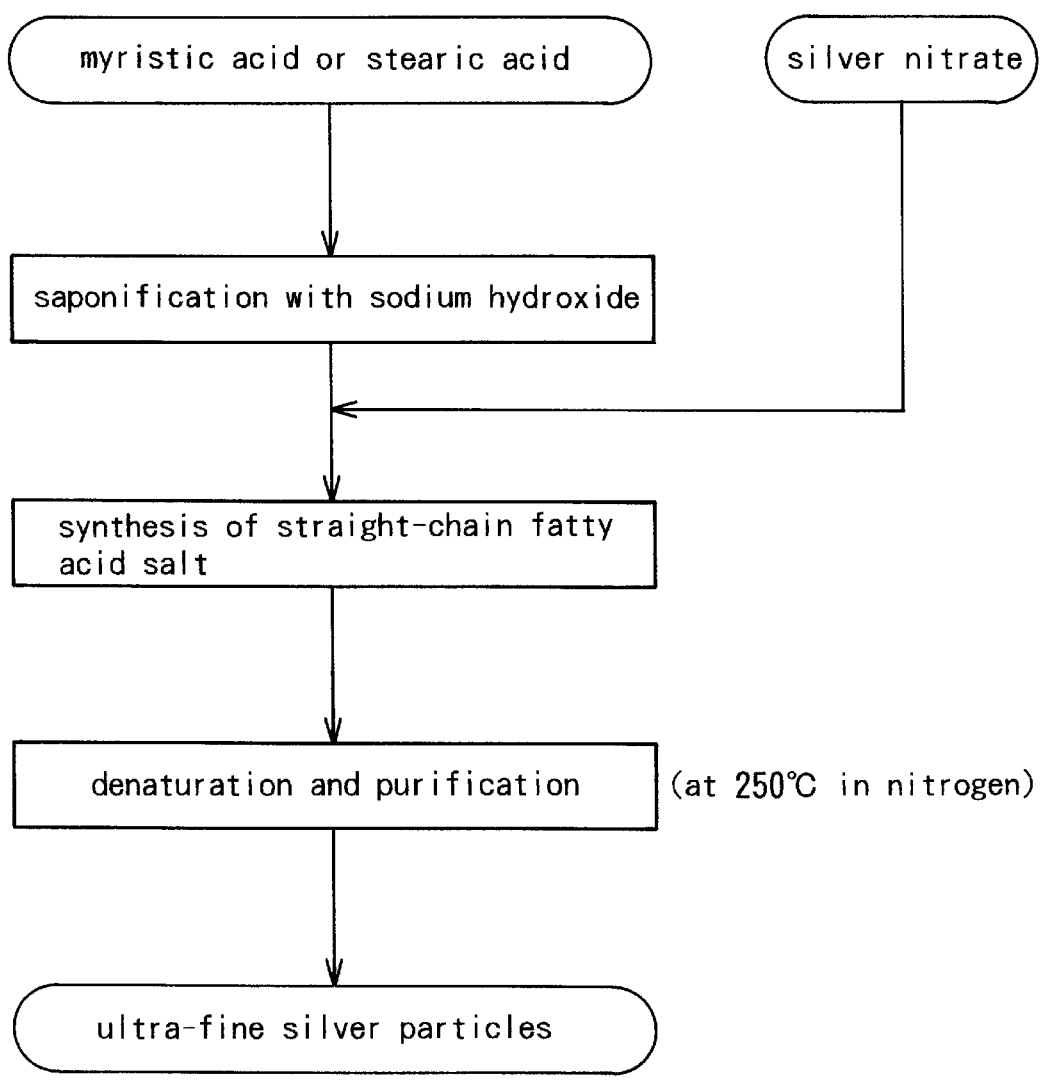
FIG. 1 is a diagram showing an embodiment of a production process of ultra-fine silver particles used in the present invention.

FIG. 1 shows an example of a production process of ultra-fine silver particles (ultra-fine metal particles), for example, having an average particle diameter of 1 to 20 nm, preferably about 1 to 10 nm. For example, myristic acid or stearic acid is saponified with sodium hydroxide, and the saponification product is then reacted with silver nitrate to prepare a silver salt of a straight-chain fatty acid (number of carbon atoms in alkyl group=14, 18, 18ω). The straight-chain fatty acid salt is denatured by heating at about 250° C. in a nitrogen atmosphere for 4h, followed by purification to produce ultra-fine silver particles, the periphery of which has been covered with an alkyl chain shell.

Alternatively, for example, silver nitrate (metallic salt) may be heated in a naphthenic high-boiling solvent (a nonaqueous solvent) in the presence of oleic acid (an ionic organic compound) at a temperature above the decomposition reduction temperature of silver nitrate and below the decomposition temperature of the ionic organic compound, that is, at about 240° C., for 3h to produce ultra-fine silver particles, the periphery of which is covered with the ionic organic compound.

In the ultra-fine silver particles thus produced, the periphery of the particles covered with the alkyl chain shell or the ionic organic compound. Therefore, when the ultra-fine silver particles are added to an organic solvent, for example, cyclohexane, they do not mutually agglomerate and are stably and homogeneously dispersed in the solvent to create a transparent state, that is, a solubilized state.

It is known that the melting point of the metal particles lowers with reducing the particle diameter. The particle diameter in which this effect appears is less than 20 nm. This effect is significant when the particle diameter is less than 10 nm. For this reason, the average particle diameter of the ultra-fine silver particles is preferably 1 to 20 nm, particularly preferably 1 to 10 nm. For example, the use of ultra-fine silver particles having a size on a level of a cluster, that is, ultra-fine silver particles having an average particle diameter of about 5 nm, permits the ultra-fine silver particles to be melted and bonded to one another by heating at about 200° C.

Figure 2:
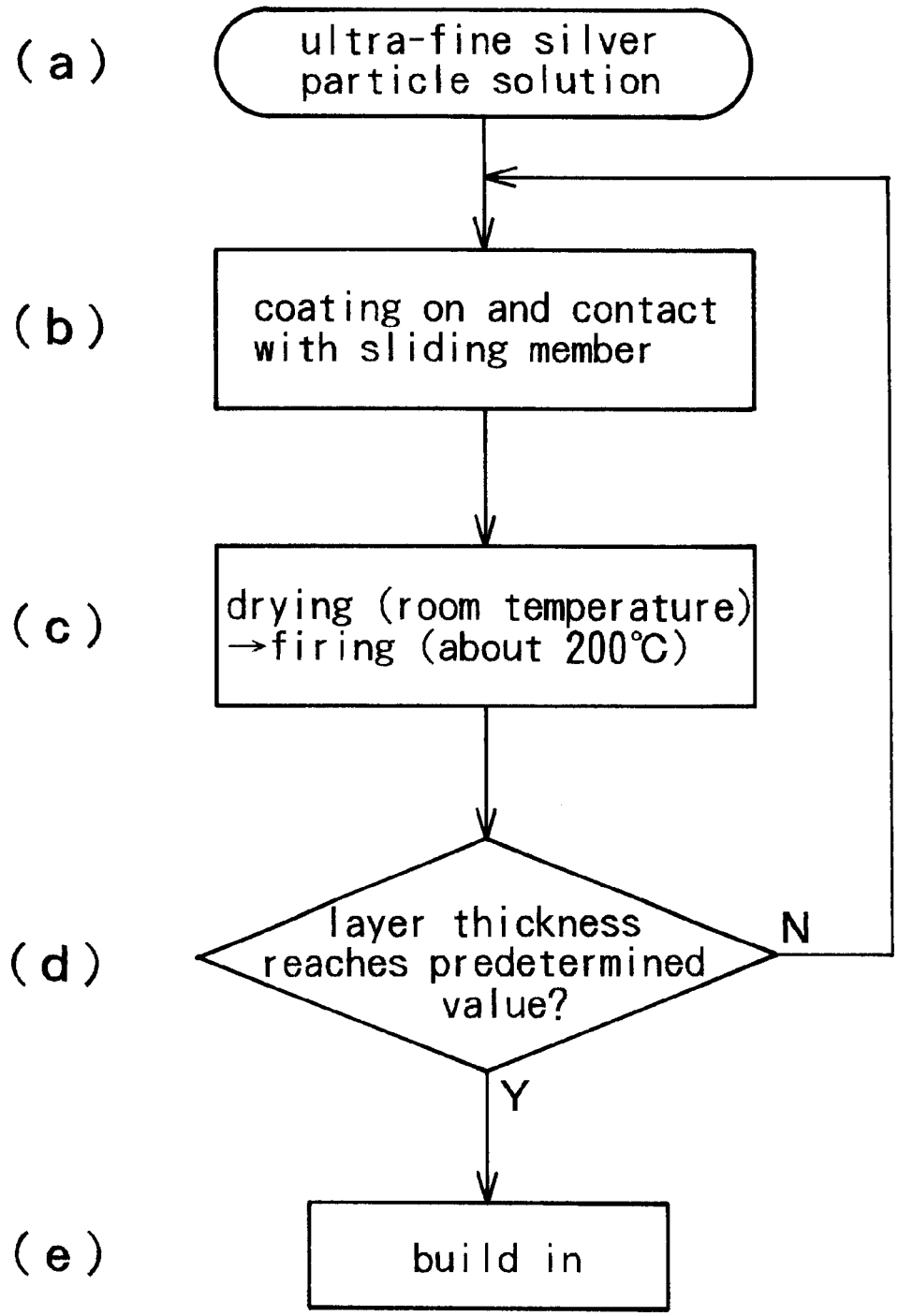
FIG. 2 is a diagram showing, in the order of steps, the production process of a sliding member according to an embodiment of the present invention.
Figure 3A:
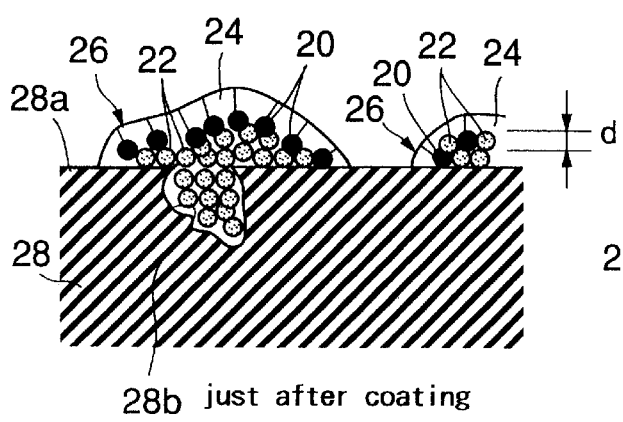
FIG. 3A shows the state of the member just after coating of an ultra-fine silver particle solution thereon.
Figure 3B:
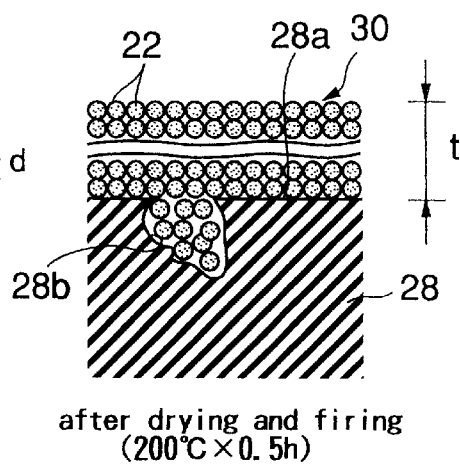
FIG. 3B shows the state of the member after firing.
Figure 4:
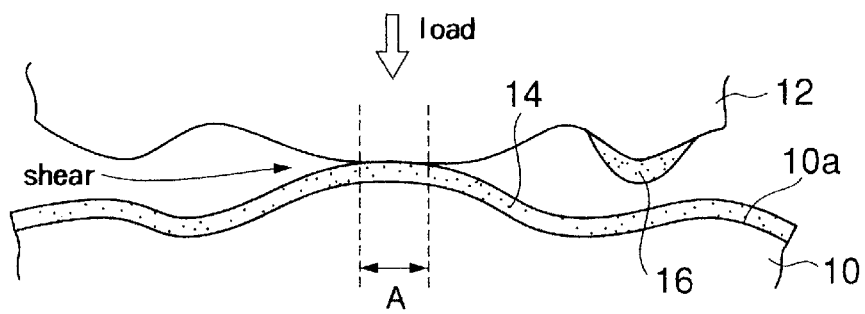
FIG. 4 is a diagram illustrating lubricating action of a conventional soft metal layer.

FIG. 2 shows, in the order of steps, the production process of a sliding member according to an embodiment of the present invention, and FIG. 3 is a schematic diagram illustrating of coating of a metal layer on a sliding member. Particularly, FIG. 3A shows the state of the sliding member just after coating of an ultra-fine silver particle solution on its sliding surface, and FIG. 3B shows the state of the sliding member after drying and firing the ultra-fine silver particles.

As shown in steps (a) and (b) in FIG. 2 and FIG. 3A, for example, an ultra-fine silver particle solution 26 having ultra-fine silver particles 22, which have a particle diameter d of about 5 nm and the periphery of which has been covered with an alkyl chain shell 20, dispersed in a suitable organic solvent 24, for example, cyclohexane, is provided. This ultra-fine silver particle solution 26 is coated on and brought into contact with the sliding member 28 in its sliding surface 28a.

At that time, the ultra-fine silver particles 22 can be homogeneously dispersed as a simple metallic substance, are less likely to agglomerate, and are highly conformable to concaves and convexes on the sliding surface 28a and thus can fully enter fine concaves 28b present originally on the sliding surface 28a.

After the ultra-fine silver particle solution 26 was evenly coated on and brought into contact with the whole area of the sliding surface 28a of the sliding member 28, as shown in step (c) in FIG. 2, the ultra-fine silver particle solution 26 coated on the sliding surface 28 is dried at room temperature to evaporate the organic solvent. Thereafter, the dried coating on the sliding surface 28 is then held at a temperature above the decomposition temperature of the alkyl chain shell 20 covering the periphery of the ultra-fine silver particles 22, for example, at a temperature of 200° C., for example, for 0.5 h to fire the coating. Thus, as shown FIG. 3B, silver layer (a metal layer) 30 consisting of ultra-fine silver particles 22 alone is formed on the sliding member 28 in its sliding surface 28a. That is, in such a state that the ultra-fine silver particles 22 have been homogeneously dispersed, the alkyl chain shell 20 covering the periphery of the ultra-fine silver particles 22 can be decomposed and consequently allowed to disappear. At the same time, the ultra-fine silver particles 22 can be melt to be bonded to one another to form a silver layer 30 having even thickness. At that time, the ultra-fine silver particles 22 fully enter fine concaves 28b originally present on the sliding surface 28a. This can improve the adhesion of the silver layer 30 to the sliding surface 28a.

The thickness t of the silver layer 30 formed by a single procedure of coating of the ultra-fine silver particle solution 26 followed by firing is about 0.1 $\mu$m at the maximum. However, the regulation of the thickness of the silver layer 30 is a critical factor in providing the optimum lubricating action. Therefore, as shown in step (d) in FIG. 2, a judgment is done on whether or not the thickness of the silver layer 30 reached a predetermined thickness. If the layer thickness does not yet reach the predetermined thickness, the above step is repeated by a necessary number of times to form a silver layer 30 having a thickness compatible with service conditions of the member used.

As shown in step (e) in FIG. 2, the sliding member 28 having a sliding surface 28a covered with a silver layer 30 having a predetermined thickness according to the above procedure is actually built in, for example, for use as a sliding member, for example, under high-temperature or vacuum environment.

The whole silver coating process in this embodiment can be carried out in the air at room temperature to 200° C. Therefore, unlike the conventional electroplating and ion plating, the silver coating process in this embodiment is very simple, and, at the same time, is highly reliable. That is, a specialty power source is unnecessary, and, in addition, the use of a very small amount of an ultra-fine silver particle solution suffices for satisfactory results. Therefore, highly reliable coating operation can be easily carried out particularly even in the case of sliding members having a complicated shape and even in sites of which the environment is not suitable for conventional coating operation. Further, the coating can be carried our without using any highly poisonous material, such as cyanogen compounds, at all. Thus, the present invention can provide a process and a sliding member, which are also advantageous in ensuring safety and health of workers.

As is apparent from the foregoing description, according to the present invention, a sliding surface of the sliding member can be covered with a metal layer at much lower cost in a simpler manner with higher reliability as compared with the conventional electroplating and ion plating.

Although certain preferred embodiments of the present invention have been shown and described in detail, it should be understood that various changes and modifications may be made therein without departing from the scope of the appended claims.

What is claimed is:

1. A process for producing a sliding member having a silver metal layer on its sliding surface, comprising:
   providing an ultra-fine particle solution of ultra-fine silver particles dispersed in a predetermined solvent;
   bringing said ultra-fine particle solution into contact with said sliding surface of said sliding member;
   drying said ultra-fine particle solution deposited on said sliding surface to form dried coating; and
   heat treating said dried coating to melt and bond said ultra-fine silver particles to one another.

2. A process according to claim 1, wherein an average particle diameter of the ultra-fine silver particles is 1 to 20 nm.

3. A process according to claim 1, where said ultra-fine silver particles are produced by heat decomposing a silver-containing organic complex or metallic salt.

4. A process according to claim 1, wherein said ultra-fine silver particles are melted and bonded to one another by heating at about 200 to 300° C.

5. A sliding member having a sliding surface thereon and a silver layer covering said sliding surface;
   wherein said silver layer is formed by bringing an ultra-fine particle solution of ultra-fine silver particles having an average diameter of 1 to 20 nm, which silver particles are dispersed in a liquid, into contact with said sliding surface of said sliding member to form a coating on the sliding member, and drying the coating and heat treating the dried coating to melt and bond said ultra-fine silver particles to one another.

6. A sliding member comprising:
   a. a sliding member having a sliding surface thereon and
   b. a silver layer covering said sliding surface;
   wherein the silver has is formed by bringing an ultra-fine particle solution of ultra-fine silver particles having an average diameter of 1 to 20 nm, which are produced by heat decomposing a silver-containing organic complex or metallic salt which is dispersed in a solvent, into contact with the sliding surface of said sliding member to form a coating on the sliding member, and drying the coating and then heat treating the dried coating to melt and bond the ultra-fine silver particles to one another.

* * * * *